(12) United States Patent
Pucci

(10) Patent No.: US 10,907,861 B2
(45) Date of Patent: Feb. 2, 2021

(54) GEOTHERMAL WELL WITH COMMUNICATING VESSELS

(71) Applicants: Aurelio Pucci, Frascati (IT); Umberto De Luca, Grottaferrata (IT)

(72) Inventor: Aurelio Pucci, Frascati (IT)

(73) Assignees: Aurelio Pucci, Frascati (IT); Umberto De Luca, Grottaferrata (IT)

( * ) Notice: Subject to any disclaimer, the term of this patent is extended or adjusted under 35 U.S.C. 154(b) by 126 days.

(21) Appl. No.: 16/310,649

(22) PCT Filed: May 30, 2017

(86) PCT No.: PCT/IB2017/053160
§ 371 (c)(1),
(2) Date: Dec. 17, 2018

(87) PCT Pub. No.: WO2017/216664
PCT Pub. Date: Dec. 21, 2017

(65) Prior Publication Data
US 2019/0323736 A1 Oct. 24, 2019

(30) Foreign Application Priority Data
Jun. 15, 2016 (IT) .................. 102016000061427

(51) Int. Cl.
*F24T 10/17* (2018.01)
*F24T 10/00* (2018.01)

(52) U.S. Cl.
CPC .......... *F24T 10/17* (2018.05); *F24T 2010/56* (2018.05)

(58) Field of Classification Search
CPC ....... F24T 10/17; F24T 10/00; F24T 2010/56; F25B 30/00; Y02E 10/125
See application file for complete search history.

(56) References Cited

U.S. PATENT DOCUMENTS

| 4,574,875 A | 3/1986 | Rawlings et al. |
| 5,095,705 A * | 3/1992 | Daly .................. F03G 3/00 60/641.2 |
| 2010/0270003 A1 | 10/2010 | Sarria |
| 2016/0011570 A1 | 1/2016 | Gill et al. |
| 2017/0292792 A1 | 10/2017 | Yokomine et al. |

FOREIGN PATENT DOCUMENTS

| GB | 1 204 026 A | 9/1970 |
| WO | 2016/035770 A1 | 3/2016 |

OTHER PUBLICATIONS

International Search Report, dated Aug. 10, 2017, from corresponding PCT/ib2017/053160 application.

* cited by examiner

*Primary Examiner* — Elizabeth J Martin
(74) *Attorney, Agent, or Firm* — Nixon & Vanderhye

(57) ABSTRACT

A geothermal well with communicating vessels, formed of an internal piping transferring an inflow down to a level of the depth of the well, and an external piping coaxial to the internal piping and with a diameter that permits ascent of the fluid upward from the distal end of the well, wherein a flange on the internal piping engages a collar connected to the external piping via spacers, wherein detection sensors generate information on oscillations of the pipings, wherein an automatic safety valve avoids overpressures, and a driven regulation valve generates information on fluid pressure, and wherein software monitors fluid circulation within the well and operates the inlet pump and the regulation valve to dampen the oscillations and prevent microseisms.

9 Claims, 3 Drawing Sheets

GEOTHERMAL WELL WITH COMMUNICATING VESSELS

FIELD OF THE ART

The present invention regards alternative and renewable energy sources, in particular it regards energy transformation plants that use the heat found in the deepest layers of the subsoil as the primary source of energy. More in detail, the present patent provides a new and innovative geothermal well adapted to transfer heat from the subsoil to the water that is introduced into the well, resolving the criticalities observed in such kind of plants up to date.

PRIOR ART

Geothermal energy is the energy that comes from geological heat sources and, within relatively short operational times, it may be considered an alternative and renewable source. It is based on exploiting the geothermal gradient, i.e. the natural heat of the earth, due to the thermal energy released by the natural nuclear decay processes of radioactive elements such as uranium, thorium and potassium. Penetrating deep, beneath the earth surface, temperature rises gradually, averagely increasing by about 30° C. per km into the earth crust and by about 80° C. per km into the mantle. These are mean values. As a matter of fact, thermal gradients could even be tens of times higher or lower. However, the deposits of this energy are at times too deep for them to be exploited. Extracting and using the energy trapped in the Earth requires identifying an area with a positive thermal abnormality, where the terrestrial heat is concentrated: these areas are commonly referred to as geothermal reservoirs or deposits.

Hot sources were used for bathing at least since the paleolithic age. In the first century AD, Romans conquered Aquae Sulis, today's Bath, in England and used its hot sources for supplying public baths and floor heating. The fees for entry into these baths represented the first commercial use of geothermal energy. The most ancient geothermal system for a district was installed in Chaudes-Aigues, France and began operating in the 14th century. The first industrial exploitation dates back to 1827, when the vapour of a geyser was used for extracting boric acid from a mud volcano, in Larderello, in Tuscany.

In 1892, the first heating system in the United States in Boise (Idaho), was directly supplied by geothermal energy and it was copied in Oregon in 1900. Deep geothermal wells and geysers were used for heating greenhouses in Iceland and Tuscany since 1943.

In the 20th century, electrical energy demand led to considering geothermal power as the primary source for producing electrical energy. Prince Piero Ginori Conti experimented the first geothermal generator on 4 Jul. 1904, in the same Larderello field, where extraction of geothermal energy from acids began. This experiment enabled lighting four lamps. Later, in 1911, the first commercial geothermal plant ever was built in the same place.

We would like to get deeper into the topic of the current energy application, with reference to a study conducted by the prestigious "MIT" (Massachusetts Institute of Technology).

Energy obtained by exploiting the geothermal gradient, currently represents at least 2% of energy demand worldwide. However, according to the aforementioned study, beneath our feet there is an energy potential, generated by the terrestrial heat, amounting to approximately 12,600,000 Z Joules.

Given that the annual energy demand across the Earth amounts to about 0.5 Z Joules and given that modern technology enables us to use just 2,000 Z Joules of said energy, it is clear that utilising geothermal energy alone would be sufficient to meet the energy demand of the entire planet, through green energy, for the next 4,000 years.

Studies aimed at optimising geothermal plants, led to developing binary-cycle plants in which interactions with low boiling coefficient fluids (medium-enthalpy geothermal) are exploited. In these plants, a mixture of water and ammonia offers good transformation yields. Also the Kaline method, led to a further 3% optimisation yield with respect to a binary cycle plant.

The binary cycle plant was presented for the first time in 1967 in the Soviet Union and it was subsequently introduced in the United States in 1981. This energy enable producing electrical energy from very low temperature sources with respect to the past.

Though the energy produced from geothermal heat sources is renewable and thus classifiable as green energy, that has no negative impact on the planet, various criticalities arise due to the existence of the plant itself. Drilling the earth crust reaching considerable depths that can even exceed 3 km beneath the soil surface, inevitably irreversibly damages the underlying rock layers. Besides this, drilling wells for the introduction of cold water which, deep below, absorbs the heat of the rocks present in the subsoil very often requires breaking hot dry rocks, with the aim of increasing the heat exchange surface. Ruining geological layers may lead to catastrophic consequences for the areas surrounding the well. Constant microseisms may occur, same case applying to the critical subsidence phenomenon, i.e. the sinking of the soil level. The release of hydrogen sulfide into the air is also a frequent phenomenon that leaves foul odour over the entire area surrounding the plant. The release of lead, mercury, arsenic, limestone, hypochloric acid, hydrogen sulfide, radon and crumbling elements in general, into the water circulating in the well is equally harmful. The presence of these elements requires monitoring the composition of water and taking chemical/physical/mechanical elimination measures, considerably increasing the plant maintenance costs. In addition, the high temperatures present in the subsoil facilitate the formation of crusts in the pipings and in the heat exchangers, threatening the efficiency of the plant over time.

Thus, monitoring the plant is becoming increasingly crucial thanks to the current availability of modern technologies of software and control systems. The recently filed United States patent n° US 2016011570 describes a geothermal plant optimisation process, based on controlling the parameters of the circuit water through a plurality of sensors and detectors.

However, a geothermal well capable of avoiding the occurrence of the aforementioned drawbacks instead of monitoring them, does not seem to have been designed yet. Most phenomena arising from detrimental drilling of the soil, can be overcome by a let's say "concentric" well, i.e. a plant in which the well for introducing cold water and the one for extracting hot water, are inside each other and sealed in-depth so as to form a circuit. Actually, up to date the drilling operations required for installing a geothermal well have always been at least two, one or more for the inflow piping and one or more for the outflow piping. This entails doubling production costs as well as the environmental problems described above.

Thus, an object of the present invention is to provide a geothermal well capable of overcoming the environmental criticalities and requiring low maintenance, guaranteeing an operational duration of about 35 years. Furthermore, the operation of the well in question is supported by a dedicated software that guarantees the maintenance of the conditions required for proper and safe use of the plant.

DESCRIPTION OF THE INVENTION

According to the present invention, a geothermal well with communicating vessels is provided whose main purpose is to reduce the geothermal plant production costs as well as avert the environmental problems related to the presence of the well in the subsoil.

More in detail, the well of the present invention requires drilling only once instead of twice as required by the geothermal wells in use up to date. Furthermore, the geothermal well in question effectively eliminates problems related to the subsidence and microseisms phenomena that have never been solved up to date.

Just like the common wells in use up to date, such geothermal well exploits the endogenous heat typical of the deepest rock layers of the Earth's subsoil. With the aim of extracting and making it exploitable, a fluid, commonly represented by water, is introduced into a piping vertically extending beneath the soil level. Descending, the fluid absorbs part of the Earth's heat and it is subsequently once again conveyed to the surface, through an extraction piping, which conveys the fluid to a heat user device, i.e. any device adapted to exploit said heat as primary source of energy.

Advantageously, the geothermal well in question, is made up of an internal piping 20 and an external piping 10 arranged coaxially and adapted to serve, respectively, as a piping for introducing the inflowing cold fluid 41 and a piping for removing the outflowing hot fluid 51. More in detail, said internal piping 20 is adapted to transfer an inflow 41, from an inlet pump 40 up to the level determined by the depth of the well. Such level beneath the soil level depends on the depth of interception of the geothermal coefficient and the operating temperature of the plant. Said external piping 10, instead, is suitably sized to enable the ascent of the fluid in form of an outflow 51 which, from the distal end of the well, is conveyed upward until it reaches any heat user device.

Advantageously, in order to guarantee the maintenance of the mutually coaxial position between the internal piping 20 and the external piping 10, the internal surface of each modular element 11 forming said external piping 10 is provided with a plurality of spacers 14, preferably three, which converge, following a straight path, in a circular collar 15. Such collar 15, is constituted by a circular metal element, coaxial to said external piping 10, within which the corresponding modular element 21 of said internal piping 20 is inserted during assembly. Advantageously, said corresponding modular element 21 of said internal piping 20, is in turn provided—on the external surface thereof—with a circular metal flange 24, adapted to be engaged with said collar 15 with the aim of locking the position of said modular element 21 of said internal piping 20, with respect to said collar 15.

These solutions also help avoiding the excessive mutual oscillations between said internal piping 20 and said external piping 10.

It should be observed that the sizing of said collar 15 with respect to said modular element 21 of said internal piping 20, is such to enable the thermal expansions both in the linear direction and in the cubic direction of said modular element 21, said thermal expansions inevitably being caused by the high operating temperatures of the plant and the high pressure exerted by the circulating fluid.

Advantageously, the pressure of the circulating fluid, is regulated by an inlet pump 40, arranged at the entrance of said internal piping 20.

The safety of the entire plant regarding the geothermal well is advantageously guaranteed by a common dedicated software. The latter monitors the circulation of the fluid within the well and receives data relative to the oscillations of the pipings coming from special detection sensors 60. More precisely, said detection sensors 60 will be at least two and, even more in detail, one will regard recording the oscillations of said internal piping 20 and the other will be dedicated to the external piping 10. Possibly, said detection sensors 60, may also be adapted to transmit to said dedicated software the information regarding the chemical-physical characteristics of the circulating fluid and the internal pressure of the well.

Advantageously, said dedicated software is programmed to operate on the inlet pump 40, on a driven regulation valve 71 and on a plurality of actuators, with the aim of bringing the oscillations back to within pre-established threshold values, thus eliminating the potential occurrence of microseisms. Said actuators can be constituted by common motors and/or synchronous motors and/or flow regulation valves.

Advantageously, said well is also provided with an automatic safety valve 70, arranged, for safety reasons regarding potential overpressures, at the proximal end of said external piping 10. The entirety contributing to the purpose of the invention regarding eliminating impacts on the surrounding environment, due to the presence of an operating geothermal well.

Advantageously, the configuration of the well with communicating vessels already enables, due its nature, a considerable damping of the oscillations. As a matter of fact, the descent and ascent flow, mutually nullify most of the vibrations due to the opposite direction of the motion thereof. Advantageously, the total damping occurs subsequently due to the action of the software on the due actuators and valves.

A further advantage of the present invention, lies in the modularity of the pipings that the well is made up of Actually, similarly to the internal pipings 20, said external piping 10 is made up of a plurality of modular elements 11, 21, each one of which is constituted by a common cylindrical and hollow Mannesmann pipe provided with a pair of threaded sections 12-12', 22-22' arranged at the upper and lower end of said modular element 11, 21.

Said threaded sections 12-12', 22-22' are advantageously adapted to enable the stable but reversible screwing and fixing, of each modular element 11, 21 with the subsequent one, up to obtaining the desired depth for both pipings 10, 20.

Contrary to the other modular elements 11, the terminal element 31 of the external piping 10 is advantageously constituted by a cylinder provided with a threaded section 31' at the upper end and with a closure cap 13 at the lower distal end. This, so as to prevent the outflow of the fluid from said external piping 10 and the ensuing dispersion thereof into the ground 5.

Said internal piping 20, instead has a terminal element 32 provided with a threaded section 32' at the upper end and with a free end 23 at the lower end. This to enable the outflow of the fluid from the internal piping 20 to the external piping 10.

Advantageously, in order to guarantee the sealing of the joinings between the various modular elements 11, 21 both of the external piping 10 and the internal piping 20, a Teflon layer seals the joining from the internal and the external.

One of the further advantages offered by the geothermal well in question, lies in the fact that it does not extract water from the subsoil, modifying the hygrometric conditions of the ground 5. As a matter of fact, after being exploited as a source of energy by a special heat user device, said outflow 51 is re-introduced into the circuit as a cooled return fluid, forming the new inflow.

Advantageously, said heat user device may be a common heat exchanger or a common vapour generator.

DESCRIPTION OF THE FIGURES

The invention will be described hereinafter in at least one preferred embodiment, provided by way of non-limiting example, with reference to the attached figures, wherein.

DETAILED DESCRIPTION OF THE INVENTION

Now, the present invention will be illustrated purely by way of non-limiting example, with reference to the figures illustrating some embodiments regarding the present inventive concept.

Figure 1:
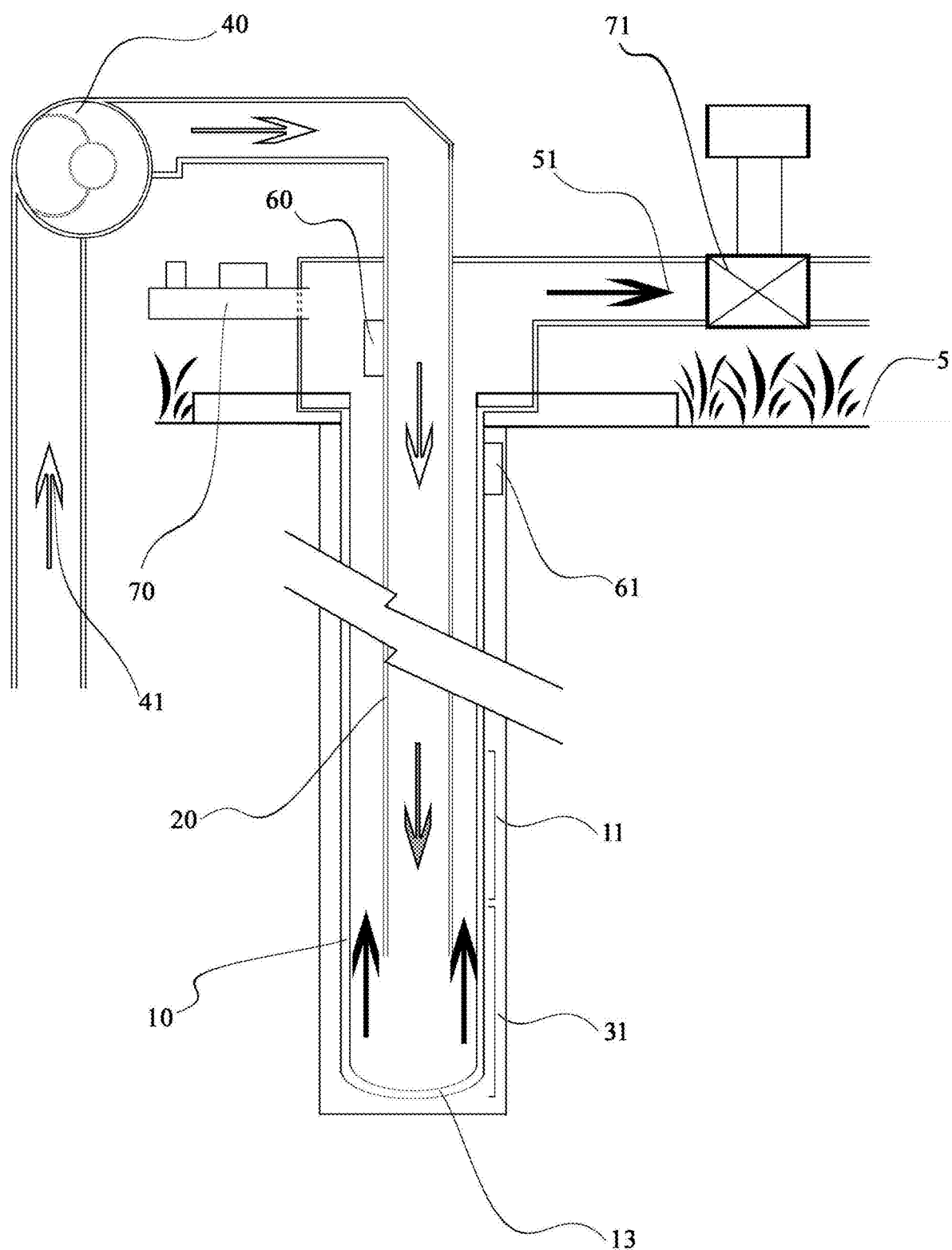
FIG. 1 shows an overall operating diagram of the geothermal well of the present invention which shows the external piping 10 and the internal piping 20 arranged in a concentric fashion. On the left of the drawing, the flow of the inflowing water 41 is illustrated which, passing through the inlet pump 40, is conveyed under high pressure in the internal pipings 20. As the water descends deeper, it gets hotter and hotter, thanks to the heat gradient present in the depth of the Earth. Upon reaching the bottom of the internal piping, the water flow, which is represented by increasingly darker arrows representing the temperature increase, ascends upwards into the space found between the external surface of the internal piping 20 and the internal surface of the external piping 10. The outflow 51, represented by the black arrow, is conveyed towards the heat exchanger and the vapour generators or any other instrument for utilising the plant. In addition, two detection sensors 60, the automatic safety valve 70 and the driven regulation valve 71, which monitor the safety and efficiency of the well through a dedicated software, are shown.

With reference to FIG. 1, an operating diagram of the geothermal well of the present invention is shown. For a better understanding of the deeply innovative aspect of the present invention, it should be observed that wells used up to date require two drillings and a piping arranged deep horizontally connecting the water inflow piping to the outflow piping. Thanks to the present invention, the outflow piping contains the piping for the inflow of water, the fluid more generally. Thus, the external piping 10 and the internal piping 20 are coaxial and the internal piping 20 is sufficiently large to guarantee a slower ascent of the outflow 51 which occurs in the circular crown comprised between the external surface of the internal piping 20 and the internal surface of the external piping 10. This so as to enable a longer period in which the fluid is at contact with the external wall of the well and thus absorbs the thermal energy thereof.

Thus, when creating the well, only one drilling will be required instead of two.

For the understanding of the invention, we would like to emphasise on the great difference that a vertical circuit has with respect to a well of the type used up to date, i.e. having a fluid path in the horizontal direction between the well, in inflow and outflow. Given that the thermal gradient increases proportionally to the increase of depth, a vertically extending system enables regulating the flow rate to the thermal power demand.

Still with reference to FIG. 1, the arrows show the fluid path. The first white arrow on the left shows the inflow 41 which—through the inlet pump 40—is conveyed into the internal piping 20 at the desired pressure. Descending deeper, the fluid absorbs the endogenous heat transmitted by the deepest rock layers. We would like to point out that the depth of the well depends on the type of rocks encountered through core sampling carried out during the preliminary study of the site. The depth thereof will be established at the planning stage as a function of the temperature detected deep down.

Increasingly hotter, the fluid reaches the distal end of the well and, given that the internal piping 20 is open, said fluid is made to flow into the external piping 10. The ascent, represented by the black arrows which constitute the outflow 51, begins from here. The latter is conveyed towards at least one special heat user device which may be both a common heat exchanger and a common vapour generator. At this point, the fluid has been cooled and it is reintroduced into circulation as a cooled return fluid, constituting a new inflow.

The reintroduction of the circulating fluid, eliminates the possibility of occurrence of the subsidence phenomenon, i.e. the sinking of the soil due to the extraction of the aquifer.

With the aim of also eliminating the microseisms that currently occur in common geothermal wells, the plant of the present invention is provided with numerous precautions for damping the oscillations generated in the internal piping 20. More precisely, the configuration of concentric flows of the well, already guarantees a given level of damping of the oscillations in that, flowing in the opposite direction, the vibrations generated by the inflow 41 at least partly nullify the vibrations generated by the ascending flow. Furthermore, a circular flange 24 is arranged outside said internal piping 20 so as to support such damping of the oscillations, ensure the maintenance of coaxiality between the two pipings and simultaneously enable the inevitable thermal expansions. Said flange 24 is adapted to be engaged—at the upper part—with a circular collar 15—belonging to the external piping 10 and connected—at the internal surface thereof—through a plurality (preferably three) of spacers 14, constituted by common bars or plates made of any metal or metal alloy, adapted to provide structural support, between the two pipings.

Figure 3:
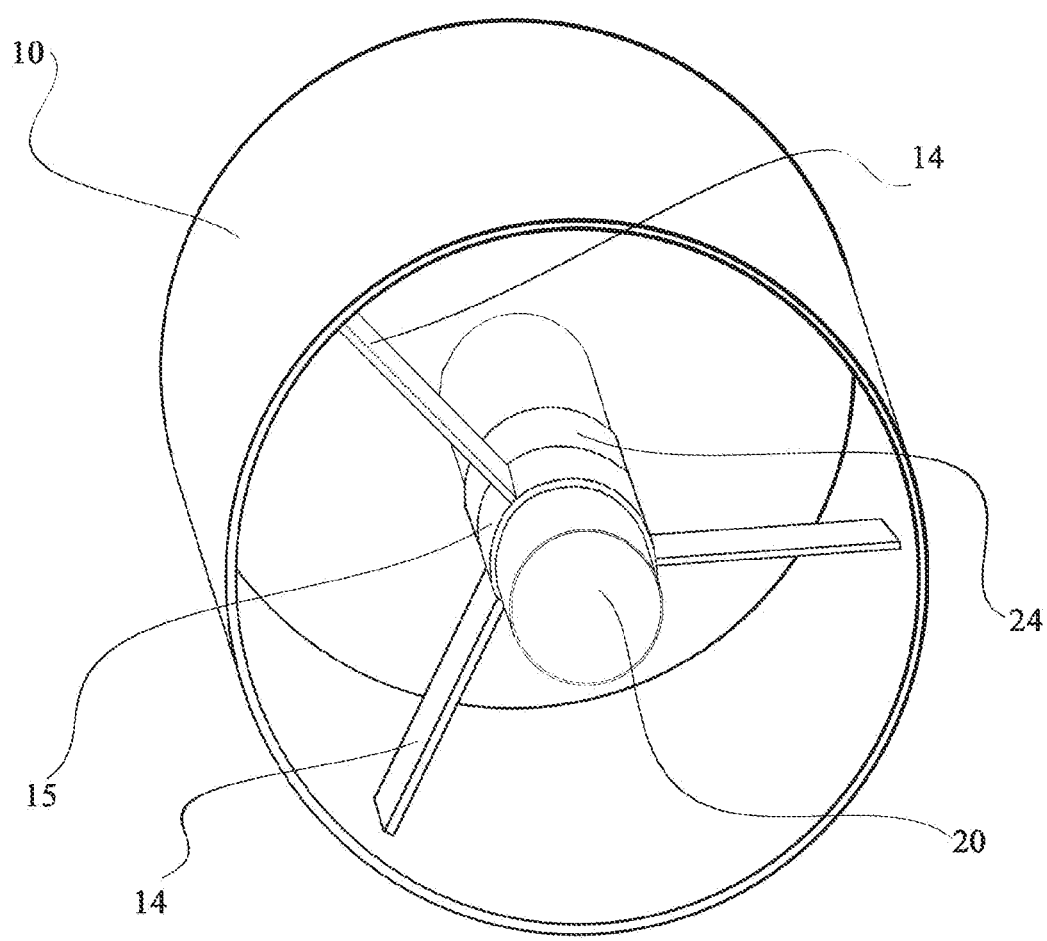
FIG. 3, as previously mentioned, shows a three-dimensional view of the deep structure of the well in which, besides the external piping 10 and the internal piping 20, there are the shown spacers 14 which, starting from the external piping 10, converge on the collar 15. It should be observed that the image is represented with a bottom to top view, i.e. from the bottom of the well towards the surface. As a matter of fact, at the top part of the collar 15, the engagement of the flange 24 is seen relative to the modular element 21 of the internal piping 20.

FIG. 3 exhaustively shows the mutual engagement between the components described above. It should be observed that the fluid is introduced into the internal piping 20 at a very high pressure, amounting to about 200 bars, thus the oscillations may be rather considerable. More in detail, said collar 15 will be suitably dimensioned to enable possible thermal expansions, both in linear and cubic direction, due to the high operating temperatures. Even more in detail, said collars 15 with the relative spacers 14, are arranged at regular intervals, in particular, in case of pipings constituted by modular elements 1, 21, there will be a collar 15 with spacers 14 for each modular element 11 of the external piping 10 and a flange 24 for each modular element 21 of the internal piping 20.

The stiffening mechanical systems, are supported by an electronic control system through a dedicated software adapted to prevent the aforementioned microseisms.

In particular, the well is provided with at least one detection sensor 60 at the external piping 10 and a detection sensor at the internal piping 20. The latter are adapted to transfer to said dedicated software, the information regarding the oscillations of the pipings 10, 20 deriving from the pressure of the circulating fluid. Possibly and preferably, said detection sensors 60 may also be adapted to communicate to said software the information regarding the chemical-physical composition of the circulating fluid and regarding the circulating pressure thereof.

Upon collecting this information, said dedicated software is capable of damping oscillations should the return flow vibrations not be sufficient to bring them back within the pre-set threshold. In particular, said software operates through the following means: a driven regulation valve 71, the inlet pump 40 and a plurality of actuators, constituted by common motors and/or synchronous motors and/or flow regulation valves, suitable to dampen the oscillations and prevent potential microseisms.

Said well is also provided with an automatic safety valve 70, adapted to automatically operate in case of detection of an overpressure of the circulating fluid.

Also the construction characteristics of the well of the present invention reveal innovative advantages. Both the external piping 10 and the internal piping 20, are constituted by a plurality of modular elements 11, 21 mutually coupled one after the other, up to reaching the project depth. Said modular elements 11, 21, are constituted by common cylindrical and hollow Mannesmann pipes (i.e. without welding), provided with a pair of threaded sections 12-12', 22-22' arranged at the upper and lower end of said modular element 11, 21. Said threaded sections 12-12', 22-22' are adapted to enable the stable but reversible screwing and fixing of each modular element 11, 21 with the subsequent one, up to obtaining the desired depth. Each joining between one modular element 11, 21 and the other is sealed by means of a Teflon layer arranged inside and outside the joining.

Figure 2A:
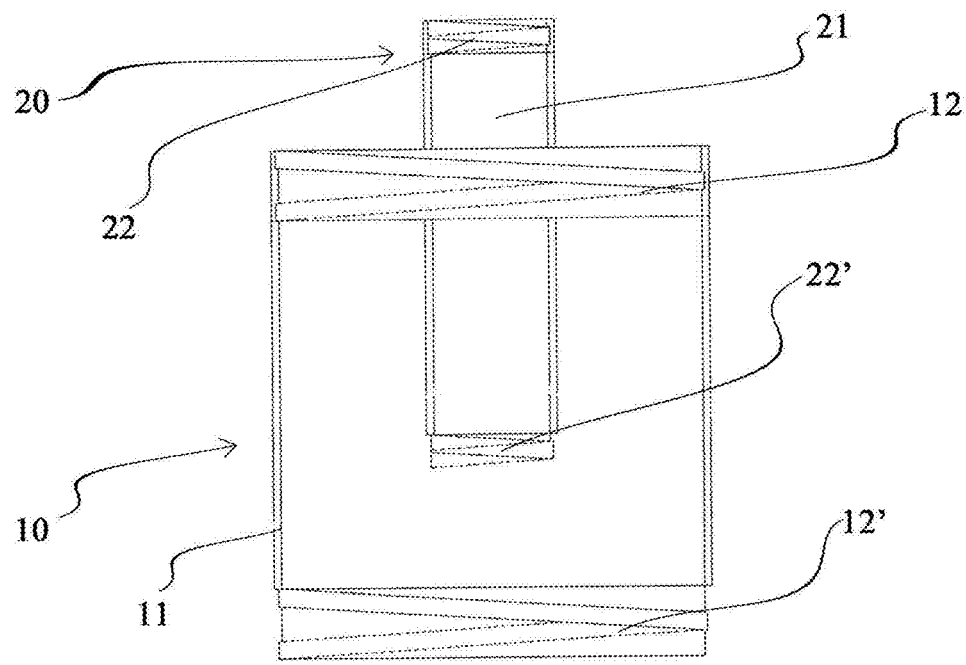
FIG. 2A shows a front view of a modular element 21 of the internal piping 20 and a modular element 11 of the external piping 10. In particular, the threaded sections 12 and 12' are shown at the two ends of the modular element 11 of the external piping 10, while other two threaded sections 22 and 22' are shown at the two ends of the modular element 21 of the internal piping 20. Such sections are designated for the stable engagement with the previous and subsequent modular element 11, 21, so as to form the pipings that descend deep into the ground 5.
Figure 2B:
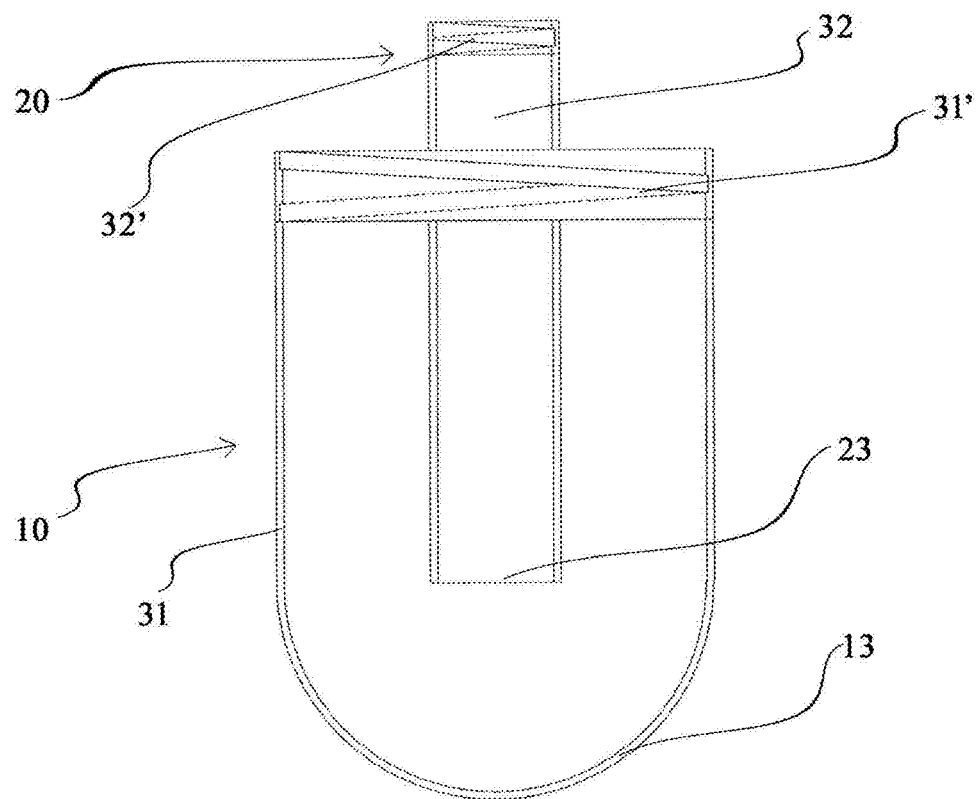
FIG. 2B illustrates the same front view of the preceding figure but, in this case, regarding the terminal modular elements 31, 32 of the internal piping 20 and the external piping 10. The corresponding threaded section 31', 32' which enables connection with the overlying modular element 11, 21 is shown at the upper end of each terminal modular element 31, 32. The lower end of the terminal modular element 31 of the external piping 10 is provided with a closure cap 13. The lower end of the terminal modular element 32 of the internal piping 20 is a free end 23 instead.
Figure 2C:
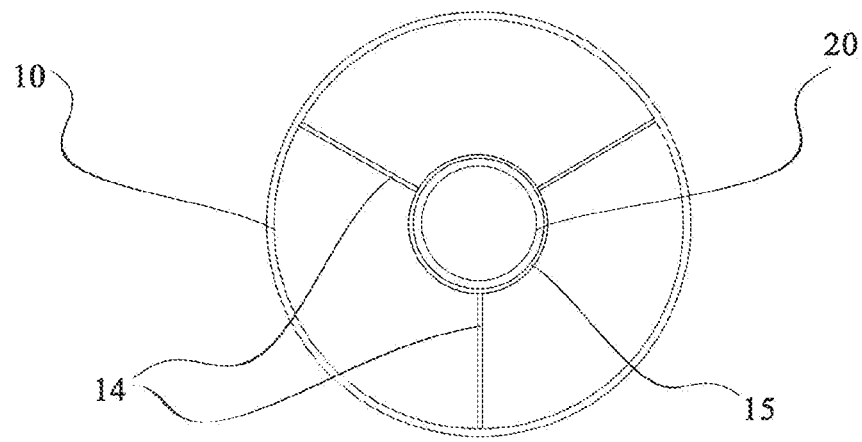
FIG. 2C shows a top view of the well, in which the external circumference representing the profile of the external piping 10, the internal circumference representing the profile of the internal piping 20 with the collar 15 on the external and three spokes present in the circular crown comprised between said internal piping 20 and said external piping 10, are shown. The three spokes represent the spacers 14, better visible and understandable with the help of the subsequent figure.

The only elements representing an exception with respect to the above, are the terminal elements 31, 32 of both pipings 10, 20, as exhaustively represented in FIG. 2B. In particular, the terminal element 31 of the external piping 10, which represents the distal end thereof, is represented by a cylindrical and hollow body, provided with a threaded section 31', like the one described previously, which enable the screwing thereof with respect to the overlying modular element 11. The opposite end is instead provided with a closure cap 13 adapted to prevent the outflow of the fluid from said external piping 10 and the ensuing dispersion thereof into the ground.

The terminal element 32 of the internal piping 20, is instead constituted by a cylindrical and hollow element provided with a threaded section 32' at the upper end, for screwing thereof to the overlying modular element 21, and with a free end 23 at the lower end. This to enable outflow of the fluid from the internal piping 20 to the external piping 10.

Lastly, it is clear that the invention described up to now may be subjected to modifications, additions or variants obvious to a man skilled in the art, without departing from the scope of protection outlined by the attached claims.

The invention claimed is:

1. A geothermal well for transfer of subterranean heat to a circulating fluid, said geothermal well comprising:

an internal piping (20) adapted to transfer an inflow (41) of said circulating fluid to a distal end of the well at a level below ground determined by a depth of the well;

an inlet pump (40) adapted to regulate a pressure of the circulating fluid;

an external piping (10), coaxial with and external to said internal piping (20), configured such that an outflow (51) of said circulating fluid flows within a space formed by a diameter of the external piping and a diameter of the internal piping, the outflow flowing from the distal end of said well upward toward a level above ground, the distal end of the well being where heat exchange occurs between said circulating fluid and subterranean heat surrounding external walls of said external piping (10);

a plurality of spacers extending between an exterior surface of the internal piping and an interior surface of the external piping, each spacer connected at a first end to a circular metal collar (15) surrounding the external surface of the internal piping, and connected at a second end to the internal surface of said external piping (10), said spacers, from the internal surface of said external piping (10), converge by following a linear path on said collar (15), said spacers (14) being made of any one metal or metal alloy, a circular flange (24) being arranged at the external surface of the internal piping and in engagement with said collar (15) so as to provide structural support to the well, to ensure a centering between said external piping (10) and said internal piping (20), and to dampen oscillations of said internal piping (20) and said external piping (10) deriving from the pressure of the circulating fluid;

an automatic safety valve (70), arranged at a proximal end of said external piping (10), said automatic safety valve (70) adapted to be activated, reversibly and automatically, so as to prevent overpressures of the circulating fluid;

a detection sensor (60) adapted to transfer to a dedicated software, information relative to the oscillations of said internal piping (20) and said external piping (10) deriving from the pressure of the circulating fluid; and a driven regulation valve (71), adapted to be reversibly activated upon command of the dedicated software for damping the oscillations detected by said detection sensor (60), wherein said dedicated software is adapted to monitor the circulating fluid inside the well at least by receiving the information from said detection sensor (60) and by operating said inlet pump (40) and said driven regulation valve (71) so as to dampen the oscillations of said internal piping (20) and said external piping (10).

2. The geothermal well according to claim 1, wherein said internal and external piping (10) is constituted by at least one external modular element (11), each external modular element constituted by an external cylindrical and hollow Mannesmann pipe, and provided with a pair of threaded sections arranged respectively at upper and lower ends of said external modular element (11), said threaded sections being adapted to allow stable and reversible screwing and fixing of each external modular element (11) with either of a subsequent external modular element (11) or a terminal external element (31) constituting the distal end of said piping, said terminal element being constituted by a cylinder provided with a threaded section at an upper end thereof and with a closure cap (13) at a lower distal end, said closure cap (13) being adapted to prevent outflow of the circulating fluid from said external piping (10) to an exterior of the external piping.

3. The geothermal well according to claim 1, wherein said internal piping (20) is constituted by at least one internal modular element (21), each internal modular element constituted by an internal cylindrical and hollow Mannesmann pipe, and provided with a pair of threaded sections arranged respectively at upper and lower ends of said internal modular element (21), said threaded sections being adapted to allow stable and reversible screwing and fixing of each internal modular element (21) with either of a subsequent internal modular element (21) or a terminal internal element (32), said terminal element being constituted by a cylinder provided with a threaded section at an upper end thereof and with a free end (23) at a lower end, said free end (23) being adapted to allow outflow of said circulating fluid from said internal piping (20) to said external piping (10).

4. The geothermal well according to claim 1, wherein said collar (15) is sized for allowing the internal piping (20) to thermally expand.

5. The geothermal well according to claim 1, wherein a first detection sensor (60) is arranged at said external piping (10) and a second detection sensor (61) is arranged at said internal piping (20).

6. The geothermal well of claim 1, wherein the collar has exactly three of the spacers connected thereto.

7. The geothermal well according to claim 1, wherein said spacers are convergent in each collar, vertically aligned with the spacers convergent in the subsequent collar.

8. The geothermal well according to claim 2, wherein said collar (15) is sized for allowing the internal piping (20) to thermally expand.

9. The geothermal well according to claim 1, wherein said piping is constituted by at least one modular element formed of a modular external element and a modular internal element, and a terminal modular element constituting the distal end of said piping and formed of an external terminal element and an internal terminal element, said external terminal element being constituted by a cylinder provided with a threaded section at an upper end thereof and with a closure cap at a lower distal end, said closure cap being adapted to prevent outflow of the circulating fluid from said external piping to an exterior of the external piping, and said internal terminal element being constituted by a cylinder provided with a threaded section at an upper end thereof and with a free end at a lower end, said free end being adapted to allow outflow of said circulating fluid from said internal piping to said external piping.

\* \* \* \* \*